United States Patent [19]

Genest et al.

[11] 4,213,118

[45] Jul. 15, 1980

[54] COMBINATION CHANGING SYSTEM AND METHOD

[75] Inventors: Leonard J. Genest, Santa Ana; Vache B. Madenlian, Huntington Beach, both of Calif.

[73] Assignee: Chromalloy Electronics Corporation, St. Louis, Mo.

[21] Appl. No.: 910,052

[22] Filed: May 26, 1978

Related U.S. Application Data

[63] Continuation-in-part of Ser. No. 739,927, Nov. 8, 1976, abandoned.

[51] Int. Cl.$^2$ ........................ H04Q 3/00; E05B 49/00

[52] U.S. Cl. ........................ 340/149 R; 340/142 MD

[58] Field of Search ........ 340/149 A, 149 R, 147 MD

[56] References Cited

U.S. PATENT DOCUMENTS

| | | | |
|---|---|---|---|
| Re. 29259 | 6/1977 | Sabsay | 340/149 A |
| 3,761,892 | 9/1973 | Bosnyak et al. | 340/149 A |
| 3,800,284 | 3/1974 | Zucker et al. | 340/149 A |
| 3,821,704 | 6/1974 | Sabsay | 340/149 A |
| 3,859,634 | 1/1975 | Perron et al. | 340/149 R |
| 3,860,911 | 1/1975 | Hinman et al. | 340/149 R |
| 3,926,021 | 12/1975 | Genest et al. | 340/149 A |
| 3,944,976 | 3/1976 | France | 340/149 A |

*Primary Examiner*—Donald J. Yusko

*Attorney, Agent, or Firm*—Nilsson, Robbins, Dalgarn, Berliner, Carson & Wurst

[57] ABSTRACT

A combination changing system and method for controlling access to a locked area and updating a lock combination or memory includes encoded key cards and storing lock code combinations in a memory. Each lock may be opened by a properly encoded key card. The lock code combination is automatically changed each time a new key card is generated and used. Specifically, first and second fields of a stored code combination are stored in an active memory of the lock and first and second fields of a key code combination to be compared therewith are encoded on a key card. When the key card is inserted into a card reader connected to the lock, two fields of the stored code combination are first compared with the two fields of the key code combination, respectively. If there is a match, an appropriate signal is generated to open the lock. If there is no match, the second field of the stored code combination and first field of the key code combination are compared. If there is a match at this second stage, an appropriate signal is generated to store the two fields of the key code combination in the lock memory in place of the two fields of the stored code combination.

10 Claims, 5 Drawing Figures

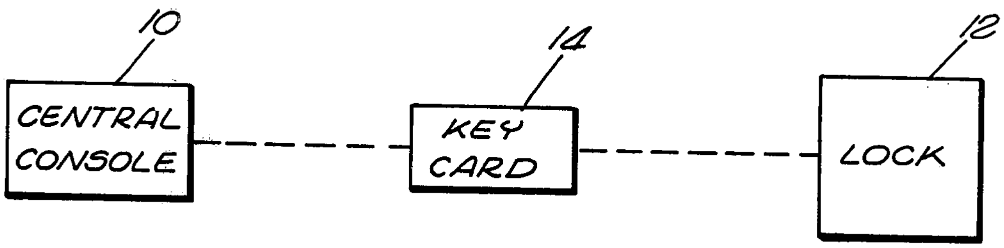
FIG. 1
FIG. 3
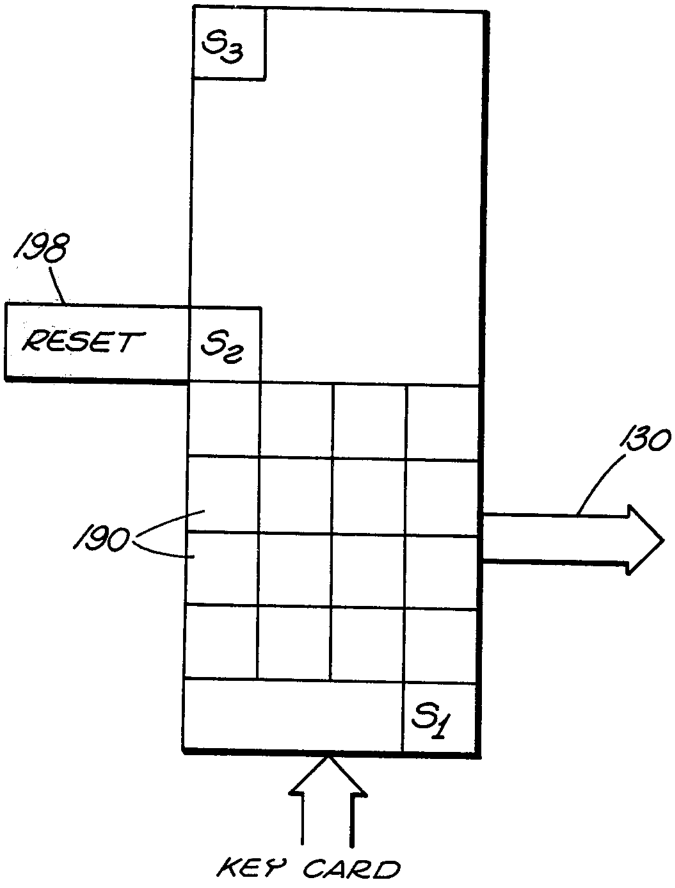

COMBINATION CHANGING SYSTEM AND METHOD

CROSS-REFERENCE TO RELATED APPLICATIONS

This application is a continuation in part of copending application Ser. No. 739,927 for SECURITY SYSTEM filed Nov. 8, 1976 and now abandoned.

BACKGROUND OF THE INVENTION

This invention relates to a combination changing system and method and, more particularly, to a system and method for controlling a lock which governs access to a locked area and for updating the lock combinations to be responsive to different key codes.

Various electronic lock systems employ a key card encoded with information in a binary code which is operable to open the lock if the lock is preset to be responsive to the code combination on the card. In such systems, a user inserts the card into a receptacle associated with the lock, and the lock circuitry actuates a bolt if the combination in the lock is identical to the code combination on the card. These systems are particularly useful in buildings, such as hotels, having large numbers of rooms required to be locked where the keys may often change hands. In addition, such systems can be used in other similar applications, such as for locking safe deposit boxes, automobiles, or rooms in a home or suite of offices.

These devices provide significant advantages over conventional lock systems. One of the primary advantages is the large number of code combinations which are available on a card of relatively small size. In addition, mechanical lock systems are generally inflexible, and changing the locks or the combination of key settings is difficult and inconvenient. In mechanical lock systems in hotels and other large buildings, a key is required for each room and the presence of a large number of keys, each of which may be stolen, presents a security problem.

Some electronic systems using key cards have attempted to overcome the deficiencies of mechanical lock systems by employing a central control unit which is electrically connected to each of the many individual door locks. The central control unit remotely sets and changes the individual lock combinations, senses the code combination on a key card inserted in the lock, and initiates some action at the remote door lock to unlock the door. One apparent disadvantage of such central systems is the susceptibility to failure of all locks if the central control unit is inoperable. In addition, electrically wiring all individual locks to a central control unit is expensive and often inconvenient, especially in older buildings.

In other electronic systems which do not employ central control units, the individual lock combination in each door must be reset by manually changing switches or electrical connections before a new key card will operate the lock. This type of system requires a large expenditure of time to change lock combinations in a facility having a large number of rooms, such as a large hotel.

Some other systems are described in the following U.S. Pat. Nos.

Zucker et al—3,800,284

Sabsay—3,821,704

Hinman et al—3,860,911

Genest et al—3,926,021

Specifically, the method illustrated and disclosed by the present invention provides a significant advantage over the method disclosed in U.S. Pat. No. 3,860,911 in that with the present invention the code combination required to open the lock initially is twice as long as the code combination disclosed by Hinman. However, this doubling of the code size in the present invention is accomplished without increasing the number of binary logic bits stored on the key card and does not require an increase in the size of the memory in the lock. By way of example, if the code combination of the present invention had thirty-two binary bits, sixteen per field, and that was also the maximum number of bits which could be stored on a key card, then Sabsay's code combination could have, at most, sixteen binary bits and the present invention would have more than 65,000 additional combinations without increasing either the storage capability of the lock or the quantity of data stored on the key. Clearly, such an increase in the number of possible lock combinations available with the present invention will provide greatly added security.

The advantages of the present invention, when compared with U.S. Pat. No. 3,821,704, depends upon the number of binary bits utilized. For example, if in the above-referenced patent, the total amount of data bits stored on the key was equal to the total amount of data stored on the key in the present invention then the storage capability of the lock of the present invention would be twice as great as that in the reference. On the other hand, if the storage capacity of the lock were equal to the storage capacity of the present invention, then the key would be required to store twice as many binary data bits as the present invention does. Furthermore, such additional storage would offer no additional security. Indeed, the probablity of randomly selecting a code which would open the lock in the Sabsay patent would be significantly greater than probability of opening the lock of the present invention.

It is therefore desirable to provide a system which enables the code combination to which the lock is responsive to be rapidly and conveniently changed.

SUMMARY OF THE INVENTION

The present invention includes a system and method for changing the combination of at least one electronic lock. An alterable memory is provided in the lock for storing code combination information. First and second combination fields of a first stored code are stored in an active memory of the lock and first and second fields of a key code combination to be compared are encoded on a key card. When the key card is inserted into a card reader connected to the lock, the encoded key code combination is read and then stored in a storage register. The stored code combination is then compared with the key code combination. If a match occurs, an appropriate signal is generated to open the lock. If there is no match, the second field of the stored code combination and the first field of the key code combination are compared. If there is a match, an appropriate signal is generated to store the dual field key code combination in the alterable lock memory in place of the dual field stored code combination.

The above method can be made to occur sequentially or simultaneously for more than one alterable lock memory. In addition, one or more of such additional method sequences can be modified so that only part of the sequence occurs if a negative result occurs at one of the comparison steps.

BRIEF DESCRIPTION OF THE DRAWINGS

In the drawings which constitute a part of this specification, an exemplary embodiment demonstrating various features of this invention are set forth herein:

FIG. 1 is a simplified block diagram showing the relationships of the various elements of the security system of the present inventions;

FIG. 3 is a schematic representation of a key card reader which may be utilized in the present invention; and, FIGS. 4A & 4B is a detailed flow diagram illustrating method of the present invention.

DETAILED DESCRIPTION OF THE INVENTION

The present invention provides a lock combination changing system for a locked area. The system includes various key cards and door locks having memories which are capable of being updated to make the locks responsive to different code combinations. This system is especially useful where many electronic locks are used in large facilities, such as in a hotel or the like. Particular reference is made to U.S. Pat. No. 3,926,021, which describes one such electronic lock with which the security system of this invention may be employed. Although only one lock will usually be referred to in describing the preferred embodiment, it will be appreciated that the system of this invention may be used with one or more locks.

In one embodiment of the invention, a central console 10, shown in FIG. 1, generates and stores all of the code combinations needed to operate a lock 12, keeps a record of all of the console's operations, and, when properly programmed, encodes a key card 14. The card 14 is used only to update the lock memory and/or to open the lock 12 from outside the secured area.

The key card 14 is encoded by inserting the card into the central console 10. Such an encoded card may then be inserted into a slot of the lock 12 to unlock the lock if the key card code combination matches a code combination stored in the lock. The card may also change or update the combination stored in an alterable memory of the lock. This feature is particularly useful in a security system for a large hotel. After one guest having a validly issued card checks out, the next guest is given a card with a partially different code combination which alters or updates the code combination stored in the memory in the lock and then opens the lock. In this manner the previously issued guest key card is rendered inoperative.

Figure 2:
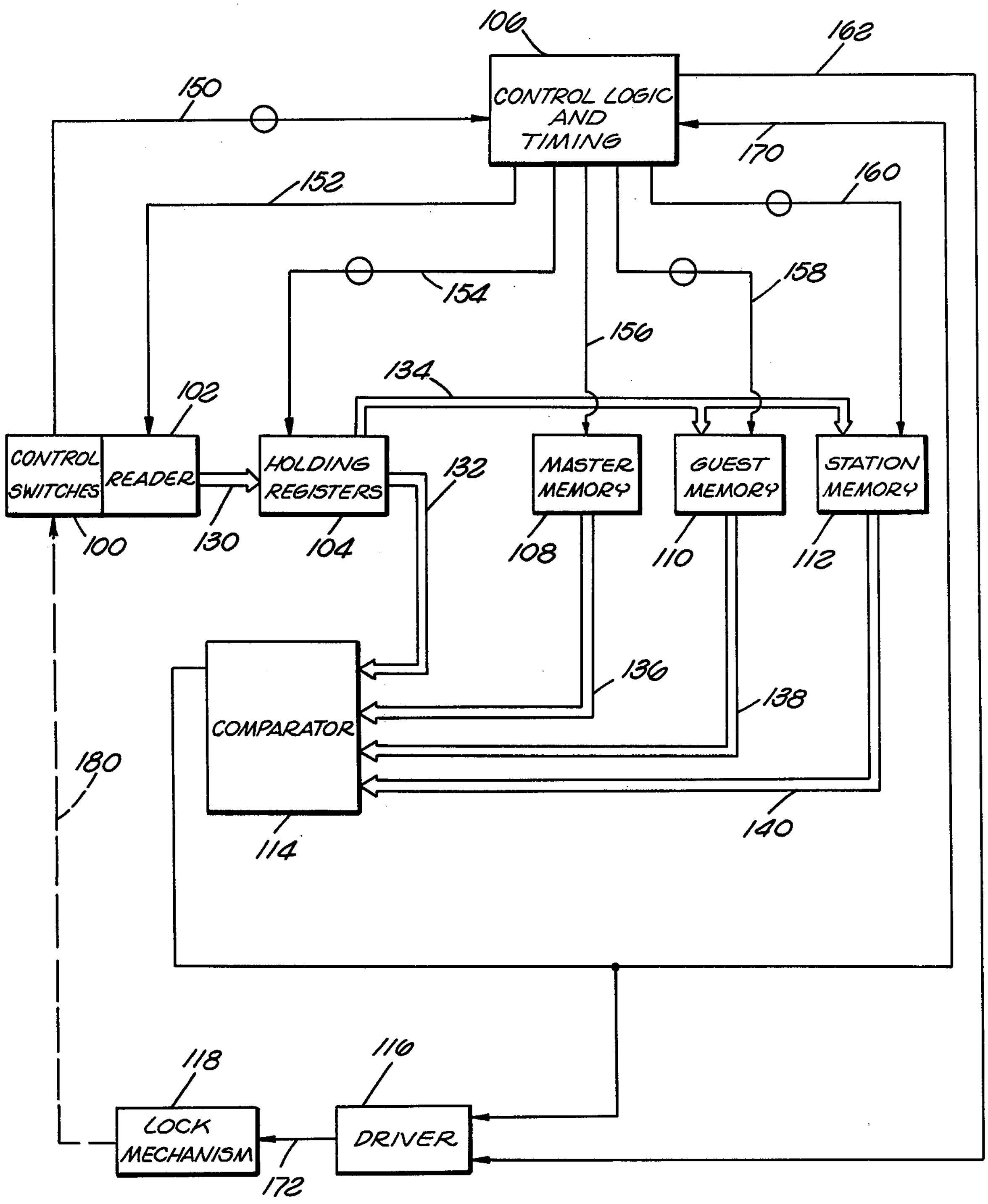
FIG. 2 is a functional block diagram showing the interrelationships of various elements in the lock portion of the system of this invention.

Some of the internal electrical lock elements are shown in FIG. 2. In one embodiment, each lock is responsive to three different types of key cards detected by the card reader 102. The master card is operative to open a large group locks, such as all of the locks in one hotel. The station card is operative to open a subgroup of locks, such as all the locks on a floor or all of the locks of a group of rooms to be serviced by one person. The guest card is operative to open the lock of only one room.

Typically, the key cards are elongated, rectangular strips adapted to be folded together to enclose a central layer of coded materials. The central layer is composed of a thin sheet of metal, such as aluminum or the like, which is secured to one-third of a piece of non-metallic, electrically insulating material, such as plastic or the like. After the key card is encoded in the central console, such as by removing portions of the central layer in a predetermined pattern in accordance with the key code combination stored in the central console, the plastic material if folded and secured together to enclose the coded central metal layer between two outer plastic layers.

In order to provide a self-contained lock, batteries may be connected to the reader 102 and to control logic and timing circuitry 106 to provide power for accomplishing the above described processes.

Reference has previously been made to changing, altering or updating one or more of the guest, station, or master memories of the lock. This updating of the alterable memories of a lock will be described with respect to one alterable memory, although it will be understood that updating of one, two or all three memories may occur in accordance with the described procedure.

The alterable memory has at least two data fields, herein referred to as M1 and M2. Each card is also enclosed with at least two data fields, herein referred to as C1 and C2. Each card has a number of binary elements corresponding to those of the associated data field of any one lock memory.

Lock circuitry such as that illustrated in FIG. 2, compares the code combination in each lock memory with the code combination received from the card to determine if there is an identity or match between the two code combinations. If a match is detected, the lock opens. If there is no match, the lock then determines whether the card is encoded to update the data in a lock memory to be responsive to a different code combination. If the card is encoded to update a lock memory, the memory is updated and and the memory and card code combinations are then again tested for a match and the lock opens.

The procedure may be performed in a sequence of steps. One preferred sequence which may be used for each field, M1 and M2, of the code combination stored in one lock memory, is shown in the following table.

| STEP | | SEQUENCE |
|---|---|---|
| 1 | | Compare C1 with M1 and C2 with M2 |
| 2 | If C1 = M1 and C2 = M2 in step 1, | Open and terminate |
| 3 | If C1 ≠ M1 or C2 ≠ M2 in step 1, | Compare C1 and M2 |
| 4 | If C1 ≠ M2 in step 3, | Return to step 1 and repeat for any other memories containing M1 and M2 data. Terminate sequence if all memories have tested. |
| 5 | If C1 = M2 in step 3, | Change M1 to C1 and M2 to C2 and return to step 1 |

Referring first to FIG. 3 in conjunction with FIG. 2, a preferred arrangement of the reader 102 and the various control switches 100 is illustrated. In that arrangement, as the key card 14 is inserted into the reader 102, a switch S1 is initially tripped by the key card thereby sending a signal on a lead 150 to the control logic and timing 106 to turn on the lock circuitry. As the key card 14 is inserted further, a second switch S2 is tripped which causes the region on the key card on which the C1 field of the key code combination is stored to be read by a plurality of sensors 190. Such an arrangement requires that the physical dimensions of the key card and the reader 102 including the sensors 190 be coordinated so that the C1 storage locations are located in correspondence with the sensors 190. When S2 is tripped, the C1 field is thus read, simultaneously outputted on the parallel leads 130 and stored in a holding register 104.

As the card is inserted further into the reader 102, a third switch S3 is tripped causing a second field, C2, of the key code combination then in position over the sensor elements 190, to be read. The C2 field so read is then outputted on the parallel leads 130 and stored in the holding register 104.

When the switch S3 is tripped, the control logic and timing 106 takes over and sequences through a series of steps with no further external timing control being required or possible as when the switches S1 and S2 were tripped by the key card being inserted in the reader 102. In the preferred embodiment, the control logic and timing 106 comprises a clock, which is activated when the switch S1 is tripped, a counter which commences to count the clock pulses which are generated when the switch S3 is tripped, and logic circuitry which generates a plurality of enabling signals where the generation of each signal occurs when the counter has reached a predetermined count. The enabling signals are then outputted on leads connected to the various other components in the lock circuitry. Although only one lead is illustrated connecting the various blocks of the lock circuitry with the control logic and timing circuitry 106, it will be appreciated that each line generally represents several leads, each of which couples one or more command signals to the components during the timed sequence of steps initiated by the control and logic circuitry 106.

In one embodiment C1 and C2 each include 16 data bits with the holding register 104 having 32 bits including a 16 bit C1 region and a 16 bit C2 region. The leads 130 will then comprise 16 individual leads. Thus, when the switch S2 is tripped by the insertion of the card in the reader 102, the C1 field of the key code combination is transferred and held in a first 16 bit region of the holding register 104 and when the switch S3 is tripped, the 16 bit C2 field of the key code combination is read and transferred to the second 16 bit region of the holding register 104. When the switch S1 is tripped and an enabling signal sent along one of the leads 150, a clock is turned on in the control logic and timing circuitry 106 which in turn generates a signal on the lead 152 to control the reading sequence and timing of the reader 102.

In this embodiment, the individual bits of the holding register 104 are coupled to a comparator 114 by 16 leads 132 so that the key code combination data in the holding register 104 may be sequentially transferred to the comparator 114.

A master memory 108, guest memory 110 and station memory 112, each provided for storing a stored code combination with a 16 bit M1 field and a 16 bit M2 field, are also coupled to the comparator 114 by three sets of 16 individual leads 136, 138 and 140 respectively. The holding register 104, the master memory 108, guest memory 110 and station memory 112 are respectively coupled to the control logic and timing 106 by one or more leads 154, 156, 158 and 160 on which appropriate read, write, and other command signals may be transmitted. The stored code combination in each of the master memory 108, guest memory 110 and station memory 112 may be transferred to the comparator 114 in response to appropriate commands from the control logic and timing block 106 along the leads 136, 138 and 140, respectively.

In the preferred embodiment, the comparator 114 compares two 16 bit code combination fields at a time, one from the holding register 104 and one from the master memory 108, the guest memory 110 or the station memory 112. Thus, the leads 136, 138 and 140 in the present illustrative example will comprise 16 individual leads for transferring first M1 field data for comparison in the comparator 114 and then M2 field data for comparison in the comparator 114.

The output lead 170 from the comparator 114 is coupled to a driver 116 which generates a signal on the lead 172 to activate a mechanical lock 118 when an appropriate compare signal from the comparator 114 is generated. The output lead 170 from the comparator 114 is also coupled to the control logic and timing 106 so that the control logic and timing 106 may select the appropriate sequence of steps to be performed depending on whether a comparison signal on the lead 170 occurs or not. Also coupled to the driver 116 is a lead 162 on which approriate control and clocking signals are provided to the driver 116.

Finally, the lock mechanism 118 mechanically activates a reset switch 198 (see FIG. 3) along the mechanical coupling path 180 which, in turn, generates a signal on one of the leads 150 to turn off the control logic and timing 106. In order to provide added security, a delay mechanism may be incorporated as part of the reset switch 198 (FIG. 3) so that if the mechanical lock 118 is not opened upon the insertion of a key card, a delay of approximately 4 seconds will transpire before the lock mechanism can again be activated by the insertion of the same or another card key.

Figure 4A:
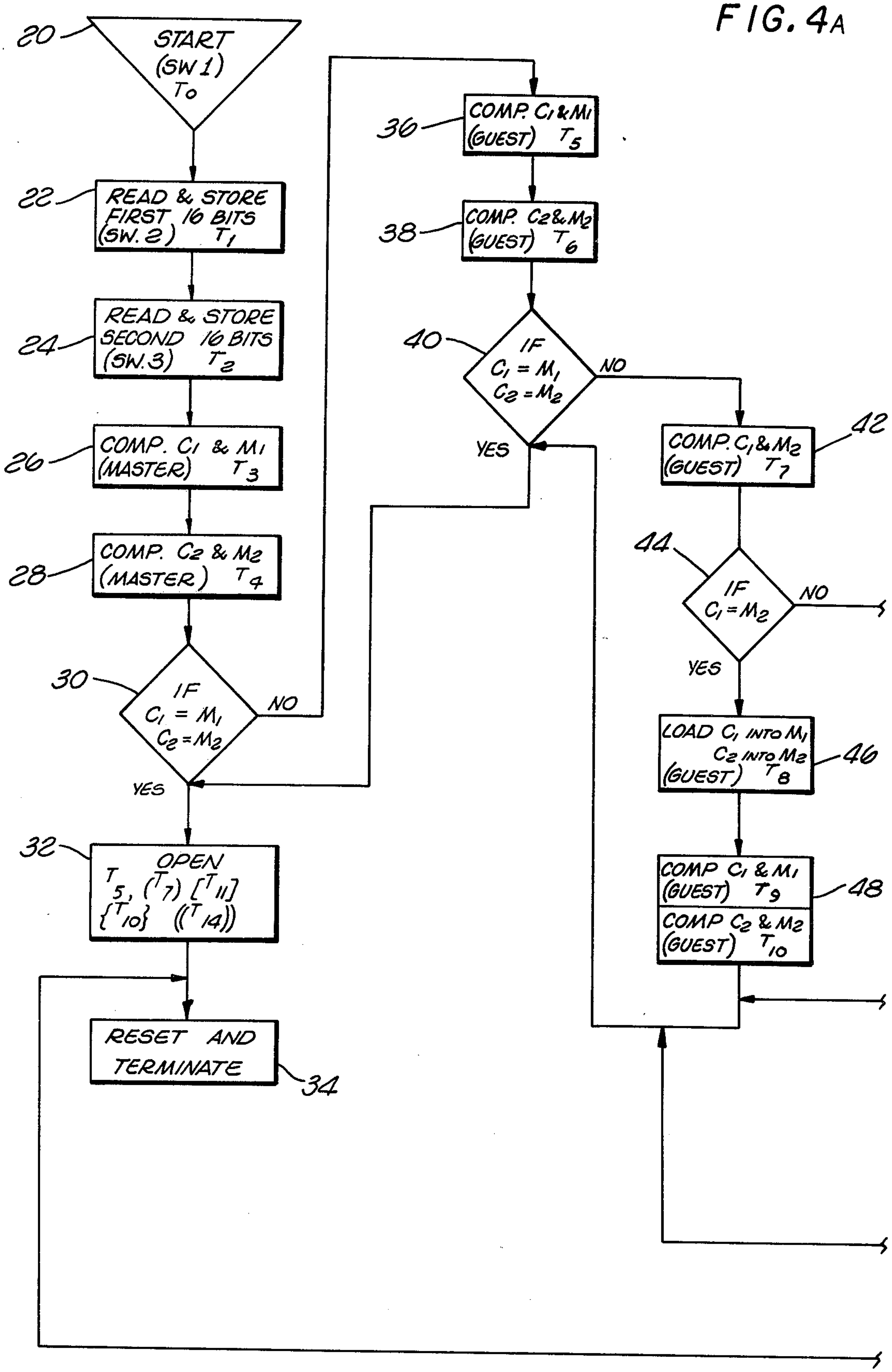
Figure 4B:
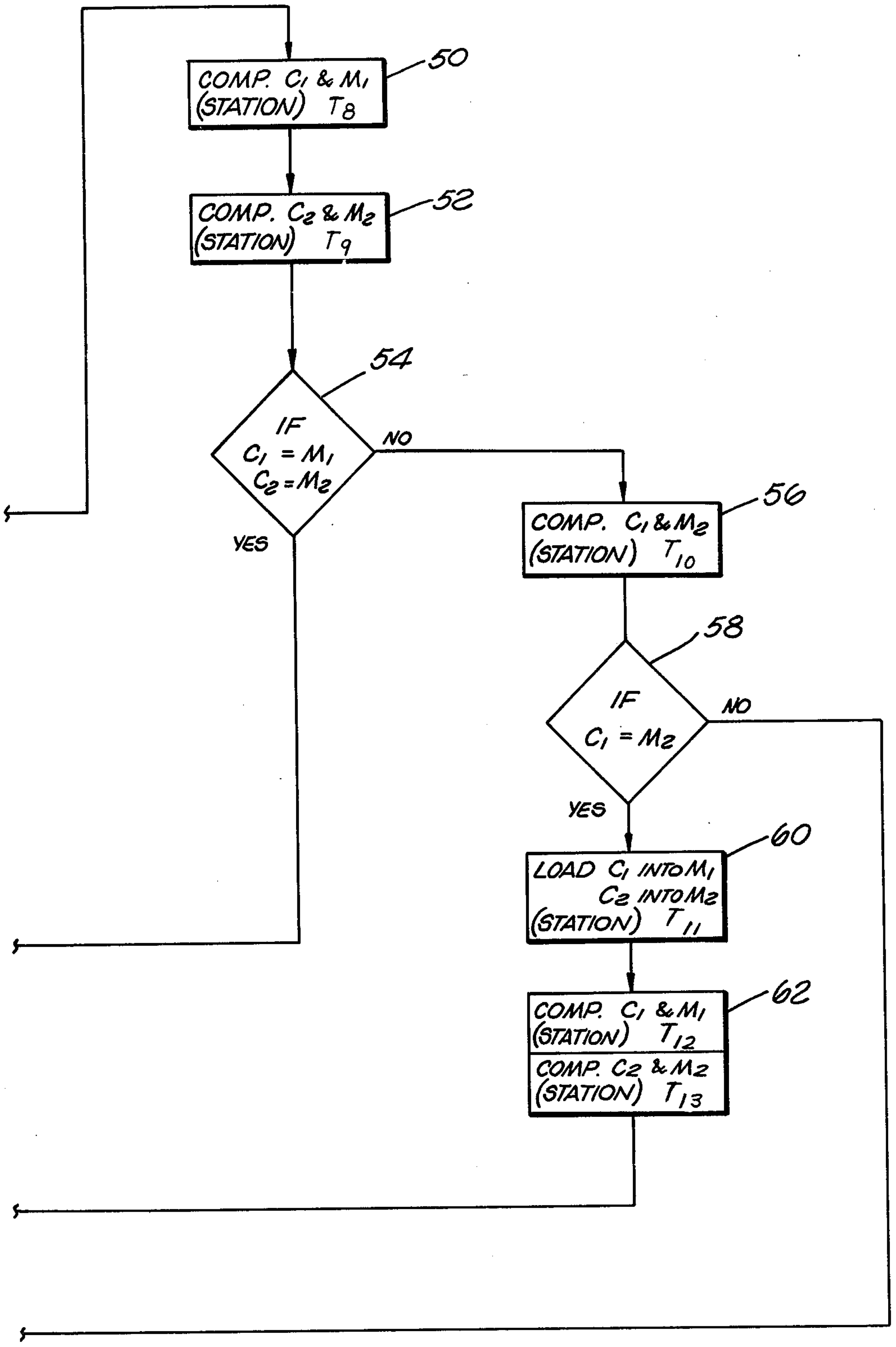

Referring now to the flow diagram of FIG. 4, in conjunction with the block diagram of FIG. 2, the preferred reading and comparing sequence by which the mechanical lock 118 in FIG. 2 may be opened is illustrated. Initially, at time $T_0$, the system is turned on by tripping the switch S1 when the key card is inserted into the reader 102 as illustrated by block 20. The second switch S2 is activated at time $T_1$, as illustrated in the block 22, by the further insertion of the key card into the reader 102. The activation of switch S2 causes the first 16 bits of key code combination data, C1, stored on the key card to be read, transferred along the leads 130 and stored in a 16 bit region of the holding register 104.

A time $T_2$ is defined when the card trips the switch S3 as the card is inserted farther into the reader, whereupon the reader 102 reads the second 16 bit field C2 of key code combination (block 24). The C2 field of key code combination data is also transferred along the leads 130 and stored in a second 16 bit region of a holding register 104.

The tripping of the switch S3 also provides an enabling signal along the lead 150 to cause the control logic and timing 106 to initiate a sequence of steps. In the preferred embodiment, the control logic and timing includes a clock, a counter which counts clock pulses, and logic which causes an enabling signal to be generated each time particular predefined count values occur. Each step is then associated with a particular count value of the counter in the control logic and timing 106.

It will thus be appreciated that at time $T_2$, the sequencing of steps is controlled by the control logic 106 and no further external control is possible. The first automatic time sequence step thus occurs at time $T_3$ as illustrated by the block 26. During this step, the C1 field of the key code combination in the holding register 104 and the M1 field of the stored code combination in the master memory 108 are respectively transferred along the plurality of leads 132 and 136 to the comparator 114. The transfer from the master memory 108 occurs in response to a read signal provided along the lead 156 from the control logic and timing 106. If C1 equals or compares positively with M1, then a flipflop or other temporary storage means in the comparator 114 may be set to await the next comparison test. Alternatively, if a compare occurs, the comparator 114 may send a signal along the lead 170 to the control logic and timing 106 which in turn disables the driver 116 by not providing an enabling signal along the lead 162 until the next comparison of C2 with M2 is positive. Of course, it will be appreciated that any other similar method may be utilized to store the results of the first comparison between C1 and M1 in the block 26 until the comparison between C2 and M2 in the next block 28 has been performed.

At time $T_4$ as illustrated by block 28, the C2 field of the key code combination is outputted on the leads 132 in response to a command from the control logic and timing 106 along one of the leads 154 and the M2 field of the stored code combination from the master memory 108 is transferred along the 16 leads 136 to the comparator 114 in response to a second command along one of the leads 156.

As illustrated in block 30, if C1 corresponds to M1 and M2 corresponds to M2 then the driver 116 generates an "open" command on the lead 172 at time $T_5$ whereupon the mechanical lock 118 opens as illustrated in the block 32. In addition, once the mechanical lock 118 is activated the reset switch 198 of FIG. 3 is also activated to turn off the circuitry as illustrated in block 34 of FIG. 4.

If C1 does not compare with or is not equal to M1 or C2 does not equal or compare with M2 in the block 30, then a compare and update sequence is initiated as illustrated by the blocks 36 through 48. Although an updating feature could be incorporated with respect to the master memory 108, in the preferred embodiment it is desired that the master memory 108 not be updated if C1 does not equal M1 or C2 does not equal M2. By not including a code combination modification feature with respect to the master memory, added security may be achieved.

If the comparisons made in the comparator 114 and illustrated in block 30 are negative, then at time $T_5$ (block 36), the control logic and timing 106 generates appropriate commands on the leads 154 to cause the C1 field of the key code combination to be transferred from the holding registers 104 along the parallel leads 132 to the comparator 114. At the same time, command signals along the leads 158 cause the M1 field of the stored code combination stored in the guest memory 110 to be transferred to the comparator 114 along the leads 138. Again, the result of this comparison is stored. At time $T_6$ (block 38) the C2 field of the key code combination from the holding register is transferred along the data leads 132 to the comparator 114 in response to appropriate command signals on the leads 154. Simultaneously, the M2 field of the stored code combination from the guest memory 110 is transferred along the leads 138 in response to command signals provided on the leads 158.

As shown in block 40, if C1 equals or compares with M1 and C2 equals or compares with M2, then the driver 116. generates a command along the lead 172 which unlocks the mechanical lock 118 at time $T_7$ as illustrated by the block 32. Again, the reset switch 198 illustrated by the block 34 is activated to turn off the clock and other electronic circuitry.

If the comparison in the block 40 is negative the C1 field of the key code combination is transferred from the holding register 104 and the M2 field of the stored code combination is transferred from the guest memory 110 in response to appropriate commands on the respective leads 154 and 158 so that C1 is compared at time $T_7$ with M2 from the guest memory 110 (block 42). If the C1 field of the key code combination is equal to or compares with the M2 field of the stored code combination from the guest memory 110, then at time $T_8$ (block 46), the C1 field of the key code combination is transferred along the plurality of leads 134 and stored in the M1 storage location of the guest memory 110 and the C2 field of the key code combination is transferred along the leads 134 and stored in the M2 storage location of the guest memory 110 in place of the M1 and M2 fields of the stored code combination previously stored therein.

In the preferred embodiment, the C1 field of the key code combination and the C2 field of the key code combination are simultaneously transferred and stored in the guest memory 110 along the leads 134. The storage of the C1 and C2 fields in the guest memory 110 is initiated by transfer enable commands along the leads 154 and a command along the leads 158. Thus, C1 and C2 are stored in the guest memory 110 rather than, for example, in the station memory 112.

After the C1 and C2 fields of the key code combination have been stored in the guest memory 110 in place of the M1 and M2 fields of the stored code combination, the C1 field and the M1 field and the M1 code combination are again compared at time $T_9$ (block 48) and the C2 field and the M2 field are again compared at time $T_{10}$ (block 48) as previously described in conjunction with the blocks 36 and 38. However, since the C1 and C2 fields have been respectively stored in the guest memory 110 in the M1 and M2 field locations and the C1 and C2 fields are not changed, the C1 and C2 fields of the key code combination will necessarily be equal to the M1 and M2 fields of the stored code combination respectively. Consequently, at time $T_{11}$, as shown in the block 32, the driver 116 will generate an "open" command on the lead 172 and the lock 118 will open. Again, the lock electronics will be turned off by the reset switch as shown in the block 34.

Returning to the block 44, if C1 does not equal the old or previously stored value of M2 in the guest memory 110, then the steps 50 through 62 are initiated wherein the data stored in the station memory 112 is compared in a like manner to that previously described.

Thus, in block 50, C1 is compared against M1 in the station memory 112 at time $T_8$. At $T_9$, as illustrated in the block 52, C2 from the holding registers 104 is transferred to the comparator 114 in response to a command on one of the leads 154 from the control logic and timing 106, and M2 from the station memory 112 is transferred to the comparator 114 along the leads 140 in response to a command along one of the leads 160. A comparison is then made to determine if C2 compares with or is equal to M2. As shown in block 54, if C1 is equal to M1 from the station memory 112 and C2 is equal to M2 from the station memory 112, then the comparator 114 generates a command which causes the driver 116 to provide a signal on the lead 172 to open the mechanical lock 118 at time $T_{10}$ (block 32). Again, the reset switch in the block 34 is thereafter activated to turn off the circuitry.

If C1 does not equal M1 from the station memory 112 or C2 does not equal M2 from the station memory 112, as shown in the block 54 in FIG. 4, then at time $T_{10}$, C1 from the holding register 104 is transferred to the comparator 114 along the leads 132 in response to commands along one of the leads 154 and M2 from the station memory 112 is transferred along the leads 140 to the comparator 114 in response to commands along one of the leads 160 as shown by the block 56. If C1 does not equal M2 from the station memory 112 (block 58), then the reset switch is activated without opening the mechanical lock thus turning off the lock for a period of time, for example, 4 seconds.

If C1 equals M2 from the station memory 112, then at time $T_{11}$, as illustrated by the block 60, C1 and C2 from the holding registers 104 are transferred along the leads 134 and stored in the M1 and M2 locations in the station memory 112. Thus, C1 and C2 replace M1 and M2 with new values of M1 and M2 equal to the values of C1 and C2 still held in the holding registers 104. The above transfer illustrated by the block 60 is made in response to commands provided along the lead 154 to the holding registers and commands along the leads 160 both from the control logic and timing electronics 106.

As shown in the block 62, at times $T_{12}$ and $T_{13}$, C1 and C2 are respectively compared against the newly stored fields M1 and M2 which necessarily results in a positive comparison. This comparison causes the driver 116 to generate a command along the lead 172 to open the mechanical lock 118 at time $T_{14}$, as shown in the block 32. The reset switch is again mechanically actuated, as illustrated by the block 34, and the electronics turned off.

In an alternative arrangement, the comparison performed in the blocks 48 and 62 of FIG. 4 may be eliminated and the lock opened directly or the C1 and C2 fields stored in place of the M1 and M2 code combination fields in the guest memory 110 and station memory 112. Of course, numerous additional variations may be incorporated as part of the present apparatus and method without departing from the spirit of the present invention.

While in the preferred embodiment, the data read by the reader 102 has been described with reference to a 32 bit field with 16 bits being allocated for the field C1 and 16 bits being allocated for the field C2, it will be appreciated that any other number of bits may be utilized. It will also be appreciated that even though various serial and parallel transfers have been described such transfers may be any other serial, parallel, or a serial-parallel combination without departing from the spirit of the present invention. In addition, the comparator 114 may be adapted to sequentially compare individual code combination fields or may be adapted to compare more than one code combination fields simultaneously.

Finally, a PSOM or TSOM module in accordance with the disclosure in our co-pending application Ser. No. 739,927, filed Nov. 8, 1976, may be utilized in place of a key card without departing from the spirit of the present invention. However, in general, the PSOM or the TSOM will be utilized to force new data directly into the master memory, the guest memory and the station memory thereby bypassing the various comparison steps. In such a case, the PSOM or TSOM loads the information or opens the lock directly. In another embodiment, the PSOM or TSOM may be provided with a lock-out feature whereby individual doors may be locked by the PSOM or TSOM. In such a case, a card will not open the lock until a PSOM or TSOM first enables the lock so that data from a card can be accepted.

It will be appreciated that the control logic timing circuitry 70 may be comprised of an arrangement of clock elements including various logic gate components which may be arranged in a number of ways well known in the art to perform the above described functions. In addition, while a timed sequence method has been specifically described where various M1 and M2 data in various memories are sequentially tested, all of the data in the various memories may be tested simultaneously or in any order in accordance with the invention.

What is claimed is:

1. A method of operating an electronic security device having an active memory means comprising the steps of (1) storing a first code combination having a first field and a second field in the active memory means for defining a first stored code combination;
(2) applying key code combination having a first and a second field to the security device;
(3) comparing the first and second fields of the first stored code combination with the first and second fields of the key code combination respectively;
(4) generating a first match signal when the aforesaid compared code combination fields correspond;
(5) utilizing said first match signal to open the security device;
(6) comparing the second field of the first stored code combination with the first field of the key code combination when the aforesaid compared fields do not correspond;
(7) generating a second match signal when the second field of the first stored code combination and the first field of the key code combination correspond;
(8) storing, in the active memory means, the key code combination in place of the first stored code combination when a second match signal is generated; and
(9) opening the security device when a second match signal is generated.

2. The method of Claim 1 comprising the further steps of:

storing a second code combination having a first field and a second field in the active memory means for defining a second stored code combination; and, comparing the key code combination and the second stored code combination according to steps 3 through 9 when the second field of the first stored code combination and first field of the key code combination do not correspond.

3. The method of Claim 2 comprising the further steps of:

storing a third code combination having a first field and a second field in the active memory means for defining a third stored code combination; and comparing the key code combination and the third stored code combination accord to steps 3 through 9 when the second field of the second stored code combination and first field of the key code combination does not correspond.

4. A method of operating an electronic security device having an active memory means comprising:

storing, in the active memory means, a plurality of stored code combinations, each stored code combination having a first data field and a second data field;

applying a key code combination having at least a first and a second data field to the security device; and comparing each stored code combination with the key code combination where the step of comparing comprises the substeps of:

(1) comparing the first and second data fields of the stored code combination with the first and second data fields of the key code combination respectively;

(2) generating a first match signal when the aforesaid compared fields correspond;

(3) utilizing the first match signal to open the security device;

(4) generating a second match signal when the second data field of the stored code combination corresponds to the first data field of the key code combination and the first match signal is not generated;

(5) utilizing the second match signal for storing the key code combination in place of the stored code combination and repeating the method starting at substep 1;

(6) repeating the substeps 1 through 5 for another stored code combination when neither a first nor a second match signal is generated; and (7) terminating the method when either the first match signal is generated or when neither a first nor a second match signal is generated for any of the plurality of stored code combinations.

5. An electronic security device for activating a lock mechanism and for receiving a coded means having a key code combination with a first field and a second field stored thereon comprising:

an active memory means having at least one lock memory, each lock memory having a first and a second section for respectively storing a first and a second field of a stored code combination;

means for reading the key code combinations stored on the coded means;

first comparison means for comparing the first and second fields of the stored code combination from at least one of the lock memories with the first and second fields of the key code combination and generating a first match signal when the aforesaid compared fields from any of the lock memories correspond;

operating means responsive to said first match signal for activating the lock mechanism;

second comparison means for comparing the second field of each stored code combination with the first field of the key code combination when the code combinations compared in the first comparison means do not correspond, and generating a second match signal when one of the second fields of the stored code combinations correspond to the first field of the key code combination; and combination changing means responsive to said second match signal for respectively storing the key code combination in one of said lock memories in place of the stored code combination therein.

6. The electronic security device of Claim 5 further comprising:

means for activating the lock mechanism in response to the second match signal.

7. A method of operating an electronic security device having an active memory means comprising the steps of:

(1) storing a first code combination having a first field and a second field in the active memory means for defining a first stored code combination;

(2) applying a key code combination having a first field and a second field to the security device;

(3) opening the security device when the first stored code combination corresponds to the key code combination;

(4) storing, in the active memory, the key code combination in place of the first stored code combination when either the first field of the stored code combination does not compare with the first field of the key code combination, or the second field of the stored code combination does not compare with the second field of the key combination and the second field of the stored code combination compares with the first field of the key combination; and (5) opening the security device when the storing of step 4 occurs.

8. A method of operating an electronic security device having a master and a guest memory, comprising the steps of:

(1) storing a first stored code combination having a first field and a second field in the master memory, and a second stored code combination, having a first field and a second field in the guest memory;

(2) applying a key code combination having a first field and a second field to the security device;

(3) generating a first match signal when the first stored code combination corresponds to the key code combination;

(4) activating the security device when the first match signal occurs;

(5) generating a second match signal when the second stored code combination corresponds to the key code combination and when the first match signal is not generated in step 3;

(6) activating the security device when the second match signal occurs;

(7) generating a third match signal when the first field of the key code combination corresponds to the second field of the second stored code combination and when the first and second match signals are not generated in step 3 and step 5;

(8) storing the key code combination in place of the second stored code combination to define a new second stored code combination in the guest memory when a third match signal is generated; and (9) activating the security device when a third match signal is generated.

9. The method of Claim 8, wherein the security device has a station memory, the method comprising the further steps of:

(10) storing a third stored code combination having a first field and a second field in the station memory;

(11) generating a fourth match signal when the third stored code combination corresponds with the key code combination and when a third match signal is not generated in steps 7 of Claim 8;

(12) activating the security device when the fourth match signal occurs;

(13) generating a fifth match signal when the second field of the third stored code combination corresponds with the first field of the key code combination and a fourth match signal is not generated in step 11;

(14) storing the key code combination in place of the third stored code combination to define a new third stored code combination in the memory, the storing occurring only when a fifth match signal is generated; and,

(15) activating the security device when a fifth match signal is generated.

10. The method of Claim 9 further comprising the step of turning off the security device both immediately after the security device is activated and when the security device has not been activated after performing all of the steps of claims 8 and 9.

* * * * *

UNITED STATES PATENT AND TRADEMARK OFFICE

CERTIFICATE OF CORRECTION

PATENT NO. : 4,213,118

DATED : July 15, 1980

INVENTOR(S) : Leonard J. Genest and Vache B. Madenlian

It is certified that error appears in the above-identified patent and that said Letters Patent is hereby corrected as shown below:

In the Abstract, line 13, after "," insert --the--.

Column 2, line 50, delete --combination-- and after "code" insert --combination--.

Column 6, line 56, after "combination" insert --data--.

Column 7, line 35, after "and" "M2" should read --C2--.

Signed and Sealed this

*Twenty-eighth* Day of *June 1983*

[SEAL]

*Attest:*

GERALD J. MOSSINGHOFF

*Attesting Officer* *Commissioner of Patents and Trademarks*